United States Patent [19]

Kawamura et al.

[11] Patent Number: 4,935,681
[45] Date of Patent: Jun. 19, 1990

[54] INVOLUTE INTERPOLATION METHOD

[75] Inventors: Hideaki Kawamura; Takao Sasaki, both of Hachioji; Kentaro Fujibayashi, Musashino; Kunihiko Murakami, Hino; Masafumi Sano, Minamitsuru, all of Japan

[73] Assignee: Fanuc Ltd., Minamitsuru, Japan

[21] Appl. No.: 335,666

[22] PCT Filed: Aug. 18, 1988

[86] PCT No.: PCT/JP88/00820
§ 371 Date: Mar. 29, 1989
§ 102(e) Date: Mar. 29, 1989

[87] PCT Pub. No.: WO89/02111
PCT Pub. Date: Mar. 9, 1989

[30] Foreign Application Priority Data

Aug. 27, 1987 [JP]  Japan ................. 62-213715

[51] Int. Cl.$^5$ ............................ G05B 19/415
[52] U.S. Cl. ................... 318/569; 318/570; 364/474.31
[58] Field of Search ............ 318/568.15, 573, 574, 318/575, 576, 569, 572, 571; 364/513, 474.31, 474.29, 474.06, 474.34

[56] References Cited

U.S. PATENT DOCUMENTS 4,736,086  4/1988  Obara ................. 318/570 X
4,791,575  12/1988  Watts, Jr. et al. ............ 318/569 X

FOREIGN PATENT DOCUMENTS

88/10455  12/1988  World Int. Prop. O. ...... 364/474.31
88/10456  12/1988  World Int. Prop. O. ...... 364/474.31
89/06392  7/1989  World Int. Prop. O. ...... 364/474.31
89/06393  7/1989  World Int. Prop. O. ...... 364/474.31

Primary Examiner—William M. Shoop, Jr.
Assistant Examiner—Paul Ip
Attorney, Agent, or Firm—Staas & Halsey

[57] ABSTRACT

An involute interpolation method is provided for machining operations in a numerical control apparatus, in which a rotational direction of an involute curve, a center position of a base circle (C), and a radius (R) of the base circle (C) are instructed, and an interpolation is performed with respect to an involute curve having a start point ($P_s$) on a first involute curve (IC1) and an end point ($P_e$) on a second involute curve (IC2). According to such a method, machining operations can be done by the use of a specifically configured involute curve which is distinct from the two involute curves.

2 Claims, 2 Drawing Sheets

INVOLUTE INTERPOLATION METHOD

TECHNICAL FIELD

The present invention relates to an involute interpolation method for machining operations in a numerical control apparatus, and more particularly to an involute interpolation method in which an involute curve depicted intermediately of two involute curves is subjected to interpolation.

BACKGROUND ART

In a curve interpolation in association with a numerical control apparatus, interpolation of an involute curve has particularly been needed for machining gears, vanes of pumps and the like, and it has been a general practice to interpolate the involute curve with a computer or an NC program producing system which is distinctly provided from the numerical control apparatus to analyze a curve data into straight line data, whereupon numerical control machinings are performed with the use of a tape.

The same applicant filed Japanese patent application No. 62-157303 in which it is proposed to readily interpolate an involute curve in a numerical control apparatus.

In practical machinings, however, an involute curve is sometimes necessary such that it starts with one involute curve and ends with another involute curve in which two involute curves, not a single involute curve, are involved. Such type of involute curve cannot be interpolated according to the proposal stated above.

SUMMARY OF THE INVENTION

An object of this invention is to provide an involute interpolation method in which such a combined involute curve can be interpolated.

In order to resolve the above-noted problem, the invention provides an involute interpolation method for use in machining operations by a numerical control apparatus, which comprises the steps of:

instructing a rotational direction of an involute curve, a center position of a base circle, and a radius (R) of the base circle;

further instructing a curve start point of a first involute curve resulting from the base circle and a curve start point of a second involute curve resulting from the base circle; and wherein an interpolation is performed with respect to an involute curve having a start point on the first involute curve and an end point on the second involute curve.

A start angle of the involute curve is set at the start of the interpolation to a start angle of the first involute curve and at the end of the interpolation to a start angle of the second involute curve, wherein the interpolation is performed while proportionally dividing a distance between the first involute curve and the second involute curve.

DESCRIPTION OF THE PREFERRED EMBODIMENT

One embodiment of the present invention will be described with reference to the accompanying drawings.

Figure 1:
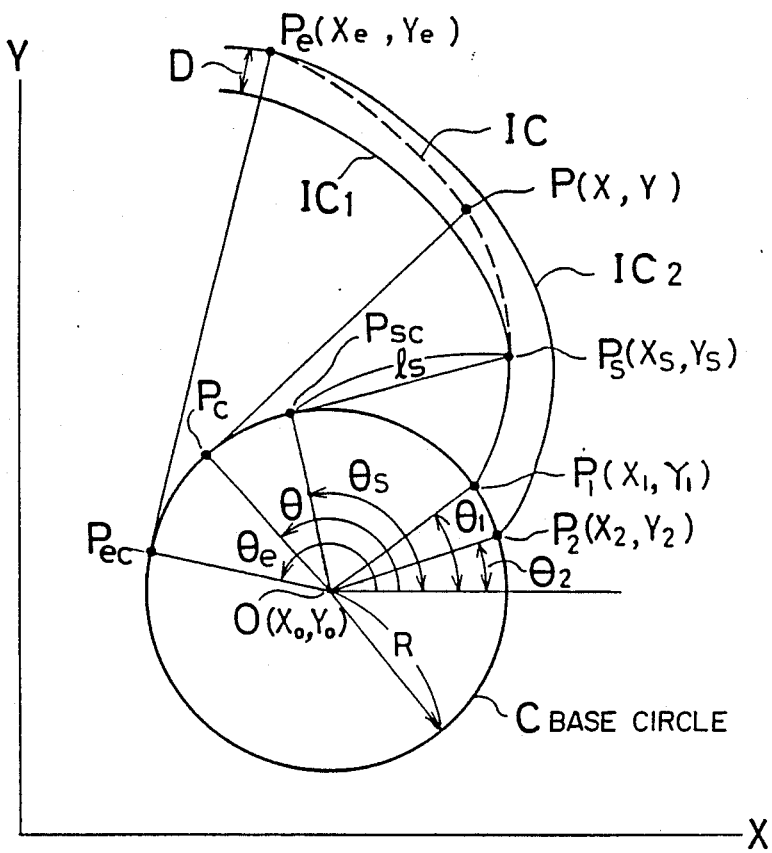
FIG. 1 is a diagram showing an involute curve according to one embodient of the present invention.

FIG. 1 illustrates an example of an involute curve according to the embodiment of the invention. In the figure, there is depicted a base circle C for the involute curve which has a center represented by a coordinate O $(X_0, Y_0)$ and a radius R.

A first involute curve IC1 starts with a point $P_1 (X_1, Y_1)$ and an angle $\theta 1$ is formed by a line connecting the points $P_1$ and O with respect to an X-axis.

A second involute curve IC2 starts with a point $P_2 (X_2, Y_2)$ and an angle $\theta_2$ is formed by a line connecting the points $P_2$ and O with respect to the X-axis.

An involute curve required as a result of interpolation is such that a point $P_s(X_x, Y_s)$ on the first involute curve IC1 is a start point for interpolation and a point $P_e (X_e, Y_e)$ on the second involute curve IC2 is an end point for interpolation, in which a moderate curve IC connectes between the start and end points as indicated by a dotted line.

Now, a tangential line is drawn from the point $P_s (X_s, Y_s)$ to the base circle C and the point of contact of this tangential line with the base circle is plotted as $P_{sc}$ to define an angle $\theta_s$ that is formed between the X-axis and a line connecting the point $P_{sc}$ and the point O. Similarly, a tangential line is drawn from the point $P_e (X_e, Y_e)$ to the base circle C and the point of contact of this tangential line with the base circle is plotted as $P_{ec}$ to define an angle $\theta_e$ that is formed between the X-axis and a line connecting the point $P_{ec}$ and the center of the circle O. A tangential line is drawn from an interpolating point P (X, Y) to the base circle C and a point $P_c(X_c, Y_c)$ is plotted on the point of contact. An angle formed between the line connecting the point $P_c$ and the center of the circle O and the X-axis is defined as $\theta$.

An instruction for the involute instruction is given by G17G03.2X--Y--I--J--R--F--;, in which G17 is an instruction for specifying an X-Y plane, G18 for a Z-X plane and G19 for a Y-Z plane.

G03.2 is an instruction of interpolation for an involute curve rotating in a counterclockwise direction. Interpolation for an involute curve rotating in clockwise direction is given by G02.2. Whether the curve approaches the base circle or it leaves from the base circle is determined depending upon the coordinate values of the start and end points of the involute curve.

X--Y-- represents coordinates of the end point of the involute curve, which in the figure, corresponds to $P_e (X_e, Y_e)$. Instruction for this is given by an absolute value but it may be given by an incremental value. In the case of the latter, an instruction is given by the coordinate of the end point $P_e$ as viewed from the start point $P_s$ of the involute curve.

I--J-- is a value of the center of the base circle C as viewed from the start point $P_s (X_s, Y_s)$, which value is instructed with an incremental value.

R-- is a radius of the base circle and F-- is a feeding speed. ";" is representative of an end-of-block. Next, values for defining the involute curve are obtained based upon those instructions.

(1) Center Coordinate O of Base Circle

The coordinate of the start point $P_s (X_s, Y_s)$ of the involute curve is not contained in the instructions. However, such has been stored interiorly of the numerical control apparatus as a current position. Based upon a distance (I, J) from the start point $P_s$ ($X_s$, $Y_s$) to the center of the base circle of the involute curve as viewed from the start point, the center coordinate O ($X_o$, $Y_o$) of the base circle is obtained from the following equations.

$$X_o = X_s + I$$

$$Y_o = Y_s + J$$

(2) Angle $\theta_s$ at Start Point of Involute Curve

A tangential line is drawn to the base circle C from the point $P_s$ ($X_s$, $Y_s$) and the point of contact of this tangential line with the base circle C is plotted as $P_{sc}$, and an angle formed between a line connecting the point $P_{sc}$ and the center O of the circle and the X-axis is defined as $\theta_s$.

(3) Angle $\theta_e$ at End Point of Involute Curve

A tangential line is drawn to the base circle C from the point $P_e$ ($X_e$, $Y_e$) and the point of contact of this tangential line with the base circle C is plotted as $P_{ec}$, and an angle formed between a line connecting the point $P_{sc}$ and the center O of the circle and the X-axis is defined as $\theta_e$.

(4) Curve Start Point Angle $\theta 1$ of Involute Curve

Assuming that the distance between the points $P_{sc}$ and $P_s$ is $l_s$, the length of the segment between the points $P_{sc}$ and $P_1$ is equal to the length of the straight line $l_s$ according to the definition of the involute curve. Accordingly, representing the length of the straight line $l_s$ with L, $$\theta 1 = \theta s - L/R \text{ (unit:radian)}$$

and the curve start point angle $\theta 1$ of the involute curve can be obtained from the above equation.

(5) From the foregoing values, coordinate of an arbitrary point on the involute curve is given by the following equations.

$$X = R \{\cos \theta + (\theta - \theta_o) \sin \theta\} + X_o$$

$$Y = R \{\sin \theta - (\theta - \theta_o) \cos \theta\} + Y_o$$

where $\theta$ is in the range from $\theta_s$ to $\theta_e$.

At the start point of the involute interpolation, $\theta_o$ is set to $\theta_o = \theta_1$, during the interpolation of the involute curve, $\theta_o$ is set to $\theta_o = \theta_o + (D/NR)$, and at the end point of the involute interpolation, $\theta_o$ is set to $\theta_o = \theta_2$. It is to be noted that N represents a number of interpolations performed in the range of $\theta_s$ and $\theta_e$ and is given by dividing a distance from the start point to the end point on the involute curve closer to the base circle by a tangential directional velocity F (instruction value). Specifically, N is given by:

$$D = (\theta_2 - \theta_1)R$$

$$N = R\{(\theta_e - \theta_1)^2 - (\theta_s - \theta_1)^2\}/2F$$

where D represents a distance between the involute curves IC1 and IC2 or a segmental distance between the points P1 and P2. With respect to the method for obtaining $\theta_o$, as expressed in the following equation, $\theta_o$ may be changed by the amount in proportion to the increment of $\theta$. Such a method gives a more accurate curve in the case where the value of D is large.

$$\theta_o = \theta_o + D(\theta - \theta_s)/\{R(\theta_e - \theta_s)\}$$

Interpolation of the intended involute curve can be accomplished if line interpolation is performed while incrementing $\theta$ by a predetermined angle and sequentially obtaining points on the involute curve IC according to the above equation.

Alternatively, the interpolation of the involute curve as intended can also be accomplished if segmental interpolation is performed with respect to three points obtained while incrementing $\theta$ by a predetermined angle.

In the above description, although specific instructions and interpolation equations are referred to, interpolation of the intended involute curve can be accomplished if there are given instructions regarding the rotational angle of an involute curve, a moving distance, and a radius and a center coordinate of a base circle. Moreover, various types of interpolation equations are available depending upon the format of instructions. The moving distance may be instructed in terms of a moving angle as viewed from the center of the base circle.

Although the above-described example is such that the involute curve rotates in counterclockwise direction and leaves from the base circle as it rotates, the above-noted equations are equally applicable to the three cases that the involute curve rotates in counterclockwise direction and approaches the base circle; the involute curve rotates in clockwise direction and approaches the base circle; and the involute curve rotates in clockwise direction and leaves from the base circle.

Figure 2:
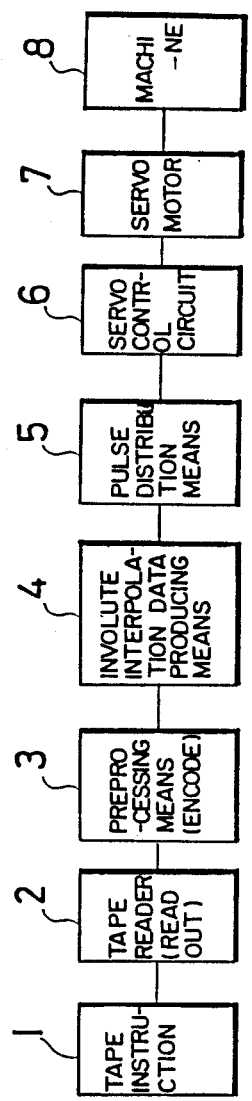
FIG. 2 is a block diagram showing a numerical control apparatus according to one embodiment of the present invention.

Next, description will be made with respect to an arrangement of a numerical control apparatus used for embodying the interpolation of the involute curve. FIG. 2 is a block diagram showing a numerical control apparatus according to the embodiment of the present invention. A tape instruction 1 is given by a tape containing the aforementioned instruction, and a tape reader 2 reads the tape 1. A preprocessing means 3 discriminates an involute interpolation instruction from a G code. An involute interpolation data producing means 4 produces data needed for the involute interpolation from the instructions. A pulse distribution means is provided in which the data produced from the involute interpolation data producing means 4 is incremented by a predetermined angle in accordance with the above equations to obtain various points on the involute curve, the line or curve interpolation is performed, and the pulses are distributed. A servo control circuit 6 drives a servo motor in response to an instruction. The servo motor 7 moves a machine 8 through a ball screw, etc.

As described, according to the present invention, an involute curve is provided such that it starts with a point on a first involute curve and ends with a point on a second involute curve, in which the start point and the end point are connected with a moderate curve line. Therefore, interpolation can be performed with respect to the involute curve which has the start and end points on different involute curves.

We claim:

1. An involute interpolation method for use in machining operations by a numerical control apparatus, which comprises the steps of:

instructing a rotational angle of an involute curve, a center position of a base circle, and a radius (R) of said base circle;

further instructing a curve start point of a first involute curve resulting from said base circle and a curve start point of a second involute curve resulting from said base circle; and wherein an interpolation is performed with respect to said involute curve having a start point on said first involute curve and an end point on said second involute curve.

2. An involute interpolation method according to claim 1, further comprising the steps of: computing a coordinate ($X_o$, $Y_o$) of said base circle, an angle ($\theta_s$) of said start point, an angle of said end point ($\theta_e$) and an angle of said involute curve start point ($\theta_o$) based upon said instructions and a coordinates of said start points; in accordance with equations representing an arbitrary point on said involute curve, $$X = R\{\cos\theta + (\theta - \theta_o)\sin\theta\} + X_o$$

$$Y = R\{\sin\theta - (\theta - \theta_o)\cos\theta\} + Y_o$$

obtaining points on said involute curve while incrementing $\theta$ in the range of $\theta_s$ to $\theta_e$ by a predetermined value, wherein $\theta_o$ is set to $\theta_o = \theta_1$ at said start point of the involute interpolation, $\theta_o$ is set to $\theta_o = \theta_o + (D/NR)$ during the interpolation of said involute curve, and $\theta_o$ is set to $\theta_o = \theta_2$ at said end point of said involute interpolation.

* * * * *